US012753276B2

(12) United States Patent
Lee et al.

(10) Patent No.: US 12,753,276 B2
(45) Date of Patent: Oct. 6, 2026

(54) POLYESTER COPOLYMER HAVING EXCELLENT STRENGTH, AND PRODUCT COMPRISING THE SAME

(71) Applicant: SK CHEMICALS CO., LTD., Gyeonggi-do (KR)

(72) Inventors: Yoo Jin Lee, Gyeonggi-do (KR); Hyun-Woo Oh, Gyeonggi-do (KR); Jin-Kyung Lee, Gyeonggi-do (KR)

(73) Assignee: SK Chemicals CO., Ltd., Gyeonggi-do (KR)

( * ) Notice: Subject to any disclaimer, the term of this patent is extended or adjusted under 35 U.S.C. 154(b) by 603 days.

(21) Appl. No.: 18/033,098

(22) PCT Filed: Nov. 4, 2021

(86) PCT No.: PCT/KR2021/015874

§ 371 (c)(1),
(2) Date: Apr. 21, 2023

(87) PCT Pub. No.: WO2022/103067

PCT Pub. Date: May 19, 2022

(65) Prior Publication Data

US 2023/0399461 A1 Dec. 14, 2023

(30) Foreign Application Priority Data

Nov. 11, 2020 (KR) ........................ 10-2020-0150210
Nov. 3, 2021 (KR) ........................ 10-2021-0149601

(51) Int. Cl.

| | |
|---|---|
| ***C08G 63/672*** | (2006.01) |
| ***C08G 63/183*** | (2006.01) |
| ***C08G 63/199*** | (2006.01) |
| ***C08G 63/80*** | (2006.01) |
| ***C08G 63/86*** | (2006.01) |

(52) U.S. Cl.

CPC ........... *C08G 63/672* (2013.01); *C08G 63/80* (2013.01); *C08G 63/863* (2013.01)

(58) Field of Classification Search

None

See application file for complete search history.

(56) References Cited

U.S. PATENT DOCUMENTS

| | | | | |
|---|---|---|---|---|
| 6,025,061 | A | 2/2000 | Khanarian et al. | |
| 2012/0177854 | A1* | 7/2012 | Lee | C08G 63/78 428/35.7 |
| 2014/0288241 | A1 | 9/2014 | Park et al. | |
| 2018/0186927 | A1 | 7/2018 | Shirahama et al. | |
| 2020/0377650 | A1 | 12/2020 | Shirahama et al. | |
| 2021/0079157 | A1* | 3/2021 | Kim | C08G 63/199 |
| 2021/0380799 | A1 | 12/2021 | Hwang et al. | |

FOREIGN PATENT DOCUMENTS

| | | | |
|---|---|---|---|
| CN | 102498150 | 6/2012 | |
| CN | 103946307 | 7/2014 | |
| JP | 2018-035338 | 3/2018 | |
| KR | 10-0515104 | 9/2005 | |
| KR | 10-1361299 | 2/2014 | |
| KR | 10-2019-0079083 | 7/2019 | |
| KR | 10-2019-0107562 | 9/2019 | |
| KR | 10-2020-0039387 | 4/2020 | |
| WO | WO-2019177297 A1 * | 9/2019 | C08G 63/183 |
| WO | WO 2020/166805 | 8/2020 | |

OTHER PUBLICATIONS

Quintana et al. "Polyterephthalates Made from Ethylene glycol, 1,4-Cyclohexanedimethanol, and Isosorbide," Journal of Polymer Science Part A: Polymer Chemistry, Mar. 2011, vol. 49, No. 10, pp. 2252-2260.

Extended Search Report for European Patent Application No. 21892235.9, dated Sep. 19, 2024, 8 pages.

International Search Report and Written Opinion for International (PCT) Patent Application No. PCT/KR2021/015874, dated Feb. 10, 2022, 8 pages.

English Translation of the International Search Report for International (PCT) Patent Application No. PCT/KR2021/015874, dated Feb. 10, 2022, 3 pages.

* cited by examiner

*Primary Examiner* — Ha S Nguyen

(74) *Attorney, Agent, or Firm* — Sheridan Ross P.C.

(57) ABSTRACT

The present disclosure relates to a polyester copolymer having excellent strength and heat resistance, and a product comprising the same.

9 Claims, No Drawings

POLYESTER COPOLYMER HAVING EXCELLENT STRENGTH, AND PRODUCT COMPRISING THE SAME

CROSS-REFERENCE TO RELATED APPLICATION

This application is a national stage application under 35 U.S.C. 371 and claims the benefit of PCT Application No. PCT/KR2021/015874 having an international filing date of 4 Nov. 2021, which designated the United States, and which PCT application claimed the benefit of Korean Patent Application No. 10-2020-0150210 filed on 11 Nov. 2020, and Korean Patent Application No. 10-2021-0149601 filed 3 Nov. 2021, the contents of each of which are incorporated herein by reference in their entireties.

TECHNICAL FIELD

The present disclosure relates to a polyester copolymer having excellent strength, and a product comprising the same.

BACKGROUND ART

Polyester has excellent mechanical strength, heat resistance, transparency and gas barrier property, and thus, is most suitable as materials of beverage filling containers, packaging films, audio, video films, and the like, and is being used in large quantities. Further, it is being worldwide produced as industrial materials such as medical fiber or tire cord, and the like. A polyester sheet or plate has good transparency and excellent mechanical strength, and thus, is being widely used as materials of cases, boxes, partitions, store shelves, protection panels, blister packaging, building materials, interior and exterior materials, and the like.

Among them, polyester is being widely used for preparation of food or beverage containers, but recently, polyester materials that can be used in dish washers, and the like, and withstand high pressure as in carbonated water containers, are required. Thus, polyester should have excellent pressure resistance and heat resistance properties. In general, pressure resistance increases as polyester has crystallinity and has higher intrinsic viscosity, and as crystallinity is higher, stretch molding of polyester is improved. To this end, isosorbide (ISB) is often used as monomers when preparing polyester, but although ISB increases heat resistance, if it is included more than a certain amount, crystallinity may decrease.

Thus, there is a demand for development of polyester resin that comprises isosorbide as monomers, but maintains crystallinity of polyester, and simultaneously, has excellent heat resistance.

DETAILED DESCRIPTION OF THE INVENTION

Technical Problem

It is an object of the invention to provide a polyester copolymer having excellent strength and heat resistance. It is another object of the invention to provide a product comprising the polyester copolymer.

Technical Solution

In order to achieve the object, according to the invention, there is provided a polyester copolymer comprising:

1) residues of dicarboxylic acid components comprising terephthalic acid; and
2) residues of diol components comprising isosorbide, cyclohexanedimethanol, and non-cyclic diol, wherein the copolymer comprises the isosorbide residues, cyclohexanedimethanol residues, and non-cyclic diol residues respectively in the content of 4 to 20 mol %, 65 to 85 mol %, and 11 to 31 mol %, based on the total number of moles of the diol component residues, and satisfies the following Mathematical Formula 1:

$$30 < (X * Y)/(Z * w) < 1000 \quad \text{[Mathematical Formula 1]}$$

in the Mathematical Formula 1,

X is storage modulus (unit: MPa) of the polyester copolymer at 40° C.,

Y is glass transition temperature (unit: ° C.) of the polyester copolymer,

Z is melting point (unit: ° C.) of the polyester copolymer, and

W is heat of fusion (unit: J/g) of the polyester copolymer.

Hereinafter, the invention will be explained in detail.

Definitions of Terms

The present disclosure relates to a polyester copolymer comprising residues of dicarboxylic acid components comprising terephthalic acid; and residues of diol components comprising isosorbide, cyclohexanedimethanol, and non-cyclic diol.

As used herein, the term 'residue' means a certain part or unit included in the product of a chemical reaction and derived from a certain compound, when the certain compound participates in the chemical reaction. Specifically, the 'residues' of dicarboxylic acid components or 'residues' of diol components respectively mean parts derived from dicarboxylic acid components or diol components in polyester copolymer formed by esterification or condensation polymerization.

Dicarboxylic Acid Components

The dicarboxylic acid components used herein mean main monomers constituting polyester copolymer together with diol components. Particularly, the dicarboxylic acid comprises terephthalic acid, and by the terephthalic acid, properties such as heat resistance, chemical resistance, weather resistance, and the like of the polyester copolymer according to the present disclosure may be improved.

The dicarboxylic acid components may further comprise aromatic dicarboxylic acid components, aliphatic dicarboxylic acid components, or a mixture thereof, besides the terephthalic acid. In this case, it is preferable that dicarboxylic acid components other than terephthalic acid are included in the content of 1 to 30 wt %, based on the total weight of the total dicarboxylic acid components.

The aromatic dicarboxylic acid components may be aromatic dicarboxylic acid having a carbon number of 8 to 20, preferably 8 to 14, or a mixture thereof. As examples of the aromatic dicarboxylic acid, isophthalic acid, naphthalene dicarboxylic acid such as 2,6-naphthalene dicarboxylic acid, and the like, diphenyl dicarboxylic acid, 4,4'-stilbene dicarboxylic acid, 2,5-furane dicarboxylic acid, 2,5-thiophene dicarboxylic acid. And the like may be mentioned, but specific examples of the aromatic dicarboxylic acid are not limited thereto. The aliphatic dicarboxylic acid components may be aliphatic dicarboxylic acid having a carbon number of 4 to 20, preferably 4 to 12, or a mixture thereof. As examples of the aliphatic dicarboxylic acid, cyclohexane dicarboxylic acid such as 1,4-cyclohexane dicarboxylic acid, 1,3-cyclohexane dicarboxylic acid, and the like, linear, branched or cyclic aliphatic dicarboxylic acid such as phthalic acid, sebacic acid, succinic acid, isodecylsuccinic acid, maleic acid, fumaric acid, adipic acid, glutaric acid, azelaic acid, and the like but specific examples of the aliphatic dicarboxylic acid are not limited thereto.

Diol Components

The diol components used herein mean main monomers constituting polyester copolymer together with the above explained dicarboxylic acid components. Particularly, the diol components comprise isosorbide, cyclohexanedimethanol, and non-cyclic diol.

The isosorbide is used to improve processability of prepared polyester copolymer. Although transparency and impact strength of polyester copolymer are improved by diol components of cyclohexanedimethanol and non-cyclic diol, shear flow property should be improved and crystallization speed should be delayed for processability, which is difficult to achieve only by cyclohexanedimethanol and non-cyclic diol. Thus, in case isosorbide is included as diol components, shear flow property may be improved and crystallization speed may be delayed while maintaining transparency and impact strength, thereby improving processability of prepared polyester copolymer. Preferably, the isosorbide residues are included in the content of 0.1 to 5 parts by weight, based on 100 parts by weight of the total diol component residues.

The cyclohexanedimethanol (for example, 1,2-cyclohexanedimethanol, 1,3-cyclohexanedimethanol or 1,4-cyclohexanedimethanol) is a component contributing to transparency and impact strength of prepared polyester copolymer. Preferably, the cyclohexanedimethanol residues are included in the content of 30 to 70 parts by weight, based on 100 parts by weight of the total diol component residues.

The non-cyclic diol is a component contributing to transparency and impact strength of prepared polyester copolymer, together with cyclohexanedimethanol. The non-cyclic diol means that a cyclic structure does not exist in the structure of a compound, and preferably, the non-cyclic diol is $C_{2-10}$-alkylenediol, more preferably ethylene glycol, or diethylene glycol. Preferably, the non-cyclic diol is included in the content of 5 to 25 parts by weight, based on 100 parts by weight of the total diol component residues.

Further, the polyester copolymer according to the present disclosure comprises the isosorbide residues, cyclohexanedimethanol residues, and non-cyclic diol residues respectively in the content of 4 to 20 mol %, 65 to 85 mol %, and 11 to 31 mol %, based on the total number of moles of the diol component residues. When the copolymer comprises each diol component residues in the above content range, the polyester copolymer according to the invention may have excellent strength and high heat resistance and crystallinity.

With regard to the residue content of each diol component, the polyester copolymer according to the present disclosure preferably satisfies the following Mathematical Formula 2:

$$0.04 \leq (ISB)/(ISB + CHDM) \leq 0.22 \quad \text{[Mathematical Formula 2]}$$

in the Mathematical Formula 2,

ISB denotes mol % of the isosorbide residues, based on the total number of moles of the diol component residues, CHDM denotes mol % of cyclohexanedimethanol residues, based on the total number of moles of the diol component residues.

The Mathematical Formula 2 relates to the contents of isosorbide residues and cyclohexanedimethanol residues, and when the above ranges are satisfied, the polyester copolymer according to the present disclosure may have more excellent strength and higher heat resistance and crystallinity.

Polyester Copolymer

The polyester copolymer according to the present disclosure may be prepared by copolymerizing the above explained dicarboxylic acid components and diol components. Wherein, the copolymerization may be conducted by sequentially conducting esterification and condensation polymerization.

The esterification is conducted in the presence of an esterification catalyst, and an esterification catalyst comprising a zinc-based compound may be used. As specific examples of such zinc-based catalyst, zinc acetate, zinc dihydrate, zinc chloride, zinc sulfate, zinc sulfide, zinc carbonate, zinc citrate, zinc gluconate, or a mixture thereof may be mentioned.

The esterification may be conducted at a pressure of 0 to 10.0 kg/cm$^2$ and a temperature of 150 to 300° C. The esterification reaction conditions may be appropriately controlled according to specific properties of prepared polyester, ratio of each component, or process conditions, and the like. Preferably, the esterification reaction may be conducted at a pressure of 0 to 5.0 kg/cm$^2$, more preferably 0.1 to 3.0 kg/cm$^2$; and a temperature of 200 to 300° C., more preferably 240 to 280° C.

Further, the esterification reaction may be conducted batchwise or continuously, and each raw material may be separately added, but it is preferable to introduce in the form of a slurry in which dicarboxylic acid components and tri-functional compounds are mixed with diol components. Further, diol components solid at room temperature, such as isosorbide, and the like, may be dissolved in water or ethyleneglycol, and then, mixed with dicarboxylic acid components such as terephthalic acid, and the like, to form a slurry. Alternatively, isosorbide may be molten at a temperature of 60° C. or more, and then, mixed with dicarboxylic acid components such as terephthalic acid, and the like, and other diol components to form a slurry. Further, water may be additionally added in the mixed slurry to assist in increase in the flowability of the slurry.

Further, the condensation polymerization reaction may be conducted at 150 to 300° C., preferably 200 to 290° C.; and a reduced pressure of 600 to 0.01 mmHg, preferably 200 to 0.05 mmHg, more preferably 100 to 0.1 mmHg. By applying reduced pressure conditions, glycol by-products of the condensation polymerization may be removed outside system, and thus, if the condensation polymerization reaction conditions do not fall within a reduced pressure condition range of 400 to 0.01 mmHg, removal of by-products may be insufficient. Further, in case the condensation polymerization reaction occurs outside a temperature range of 150 to 300° C., if the condensation reaction is progressed at a temperature below 150° C., glycol by-product of the condensation polymerization reaction may not be effectively removed outside system, and thus, intrinsic viscosity of the final reaction product may be low and the properties of prepared polyester copolymer may be deteriorated, and if it is progressed at a temperature above 300° C., it may become more likely to generate yellowing of prepared polyester resin. Further, the condensation polymerization reaction may be progressed for a time required until the intrinsic viscosity of the final reaction product reaches an appropriate level, for example, for an average residence time of 1 to 24 hours.

Further, the condensation polymerization reaction may be conducted using a condensation polymerization catalyst comprising titanium-based compounds, germanium-based compounds, antimony-based compounds, aluminum-based compounds, tin-based compounds or mixtures thereof.

As the examples of the titanium-based compounds, tetraethyl titanate, tetraethyl titanate, acetyltripropyl titanate, tetrapropyl titanate, tetrabutyl titanate, 2-ethylhexyl titanate, octyleneglycol titanate, lactate titanate, triethanolamine titanate, acetylacetonate titanate, ethyl acetoacetic ester titanate, isostearyl titanate, titanium dioxide, and the like may be mentioned. As the examples of the germanium-based compounds, germanium dioxide, germanium tetrachloride, germanium ethylene glycoxide, germanium acetate, a copolymer using them, or mixture thereof may be mentioned. Preferably, germanium dioxide may be used, and as such germanium dioxide, both crystalline or non-crystalline germanium dioxide may be used, and germanium dioxide soluble in glycol may be also used.

Further, before initiation of the condensation polymerization, or after completion of the condensation polymerization, a stabilizer, a coloration agent, a crystallization agent, an antioxidant, a branching agent, and the like may be added to the product. However, the time of introduction of the above explained additives is not limited thereto, and they may be added at any time in the preparation steps of polyester copolymer.

As the stabilizer, phosphorus-based compounds such as phosphoric acid, trimethyl phosphate, triethyl phosphate, and the like may be used. The amount of the stabilizer used is 10 to 200 ppm, based on the weight of the finally prepare polyester copolymer, on the basis of phosphorus element amount. If the amount of the stabilizer used is less than 10 ppm, stabilization effect may be insufficient, and thus, there is a concern about yellowing of polyester copolymer, and if the amount of the stabilizer used is greater than 200 ppm, polyester copolymer of desired high polymerization degree may not be obtained.

The coloration agent is added to improve the color of polyester copolymer. As the coloration agent, anthraquinone-based compounds, perinone-based compounds, azo-based compounds, methine-based compounds, and the like may be used as organic compound coloration agent, and as commercially available products, toners such as Polysynthren Blue RLS from Clarient, or Solvaperm Red BB from Clarient, and the like may be used. The amount of the organic compound coloration agent used may be controlled to 1 to 50 ppm, based on the finally prepared polyester copolymer. If the content of the coloration agent does not fall within the above range, yellow color of polyester copolymer may not be sufficiently concealed, or the properties may be deteriorated.

As the crystallization agent, a crystal nucleating agent, a UV absorber, polyolefin-based resin, polyamide resin, and the like may be used. As the antioxidant, hindered phenol-based antioxidant, phosphite-based antioxidant, thioether-based antioxidant or a mixture thereof may be used. As the branching agent, common branching agents having 3 or more functional groups may be used, and for example, trimellitic anhydride, trimethylol propane, trimellitic acid, or a mixture thereof may be used.

Meanwhile, the polyester copolymer according to the present disclosure may have intrinsic viscosity of 0.60 to 1.30 dl/g, preferably 0.65 to 1.20 dl/g. The measurement method of intrinsic viscosity will be embodied in examples described below.

Further, the polyester copolymer according to the present disclosure is characterized by satisfying the above explained Mathematical Formula 1. The Mathematical Formula 1 relates to each property of the polyester copolymer according to the present disclosure, and states in figures that when the polyester copolymer satisfies the Mathematical Formula 1, it has excellent strength and high heat resistance and crystallinity. Meanwhile, in the Mathematical Formula 1, the value of each parameter means a numerical value except unit. For example, when storage modulus of polyester copolymer according to the present disclosure is 1900 MPa, X becomes 1900.

As described in Examples and Comparative Examples below, it can be confirmed that there are remarkable differences in strength and crystallinity between the case of satisfying the Mathematical Formula 1 and the case of not satisfying the Mathematical Formula 1.

Preferably, the polyester copolymer according to the present disclosure has storage modulus (X) of 1700 to 2100 MPa. Meanwhile, the measurement method of storage modulus will be embodied in Examples below.

Preferably, the polyester copolymer according to the present disclosure has glass transition temperature (Y) of 85 to 115° C. Meanwhile, the measurement method of glass transition temperature will be embodied in Examples below.

Preferably, the polyester copolymer according to the present disclosure has melting point (Z) of 225 to 270° C. Meanwhile, the measurement method of melting point will be embodied in Examples below.

Preferably, the polyester copolymer according to the present disclosure has heat of fusion (W) of 1 to 20 J/g. Meanwhile, the measurement method of heat of fusion will be embodied in Examples below.

According to the present disclosure, there is also provided a product comprising the polyester copolymer.

Advantageous Effects

The above-explained polyester copolymer according to the present disclosure has excellent strength and heat resistance, and thus, various containers prepared therefrom can be used in dishwashers, and the like, and can withstand high pressure as in a carbonated water container.

DETAILED DESCRIPTION OF THE EMBODIMENTS

Hereinafter, preferable examples will be presented for better understanding of the invention. However, these examples are presented only for better understanding of the invention, and the scope of the invention is not limited thereby.

Example 1

Step 1) Esterification

Into a reactor with a capacity of 10 L to which a column, and a condenser that can be cooled by water are connected, TPA (terephthalic acid; 2666.7 g), EG (ethylene glycol; 597.6 g), CHDM (1,4-cyclohexanedimethanol; 1573.0 g), and ISB (isosorbide; 281.4 g) were added, and GeO2 (13.1 g) as a catalyst, phosphoric acid (8.7 g) as a stabilizer, Polysynthren Blue RLS (Clarient, 0.016 g) as blue toner, Solvaperm Red BB (Clarient, 0.004 g) as red toner, and trimellitic anhydride (0.4 g) as a branching agent were added.

Subsequently, nitrogen was added in the reactor to make a pressurized state where the pressure of the reactor is 1.0 $kgf/cm^2$ higher than atmospheric pressure. Further, the temperature of the reactor was raised to 220° C. over 90 minutes, and maintained at 220° C. for 2 hours, and then, raised to 260° C. over 2 hours. And then, the mixture in the reactor was observed with the naked eye, and until the mixture became transparent, while maintaining the temperature of the reactor at 260° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed.

Step 2) Condensation Polymerization

The pressure of the reactor with a capacity of 7 L was lowered from atmospheric pressure state to 5 Torr (absolute pressure: 5 mmHg) over 30 minutes, and simultaneously, the temperature of the reactor was raised to 265° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.71 dl/g. If the intrinsic viscosity of the mixture in the reactor reached a desired level, the mixture was discharged outside the reactor and stranded, and it was solidified with a coolant, and then, granulated such that the average weight became about 12 to 14 mg.

The particles were left at 150° C. for 1 hour to crystallize, and then, added into a solid state polymerization reactor with a capacity of 20 L. And then, nitrogen was flowed into the reactor at a speed of 50 L/min. Wherein, the temperature of the reactor was raised from a room temperature to 140° C. at a speed of 40° C./hour, and maintained at 140° C. for 3 hours, and then, raised to 190° C. at a speed of and maintained at 190° C. The solid state polymerization was progressed until intrinsic viscosity (IV) of particles in the reactor became 0.80 dl/g, thus preparing polyester copolymer.

Example 2

Step 1) Esterification

Into a reactor with a capacity of 10 L to which a column, and a condenser that can be cooled by water are connected, TPA (2374.1 g), EG (150.7 g), CHDM (1482.8 g), and ISB (751.7 g) were added, and GeO2 (13.1 g) as a catalyst, phosphoric acid (8.7 g) as a stabilizer, Polysynthren Blue RLS (Clarient, 0.019 g) as blue toner, Solvaperm Red BB (Clarient, 0.004 g) as red toner and high-density polyethylene (SK GeO centric Co., Ltd. YUZEX 2600S; 0.0038 g) as a crystallization agent were added.

Subsequently, nitrogen was added in the reactor to make a pressurized state where the pressure of the reactor is 2.0 $kgf/cm^2$ higher than atmospheric pressure. Further, the temperature of the reactor was raised to 220° C. over 90 minutes, and maintained at 220° C. for 2 hours, and then, raised to 280° C. over 2 hours. And then, the mixture in the reactor was observed with the naked eye, and until the mixture became transparent, while maintaining the temperature of the reactor at 280° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed Step 2) Condensation Polymerization The pressure of the reactor with a capacity of 7 L was lowered from atmospheric pressure state to 5 Torr (absolute pressure: 5 mmHg) over 30 minutes, and simultaneously, the temperature of the reactor was raised to 290° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.65 dl/g. If the intrinsic viscosity of the mixture in the reactor reached a desired level, the mixture was discharged outside the reactor and stranded, and it was solidified with a coolant, and then, granulated such that the average weight became about 12 to 14 mg, thus preparing polyester copolymer.

Example 3

Step 1) Esterification

Into a reactor with a capacity of 10 L to which a column, and a condenser that can be cooled by water are connected, TPA (2375.9 g), EG (248.5 g), CHDM (1690.0 g), and ISB (417.9 g) were added, and GeO2 (13.1 g) as a catalyst, phosphoric acid (8.7 g) as a stabilizer, Polysynthren Blue RLS (Clarient, 0.019 g) as blue toner, and Solvaperm Red BB (Clarient, 0.004 g) as red toner were added.

Subsequently, nitrogen was added in the reactor to make a pressurized state where the pressure of the reactor is 1.0 $kgf/cm^2$ higher than atmospheric pressure. Further, the temperature of the reactor was raised to 220° C. over 90 minutes, and maintained at 220° C. for 2 hours, and then, raised to 270° C. over 2 hours. And then, the mixture in the reactor was observed with the naked eye, and until the mixture became transparent, while maintaining the temperature of the reactor at 270° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed Step 2) Condensation Polymerization The pressure of the reactor with a capacity of 7 L was lowered from atmospheric pressure state to 5 Torr (absolute pressure: 5 mmHg) over 30 minutes, and simultaneously, the temperature of the reactor was raised to 290° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.74 dl/g. If the intrinsic viscosity of the mixture in the reactor reached a desired level, the mixture was discharged outside the reactor and stranded, and it was solidified with a coolant, and then, granulated such that the average weight became about 12 to 14 mg.

The particles were left at 150° C. for 1 hour to crystallize, and then, added into a solid state polymerization reactor with a capacity of 20 L. And then, nitrogen was flowed into the reactor at a speed of 50 L/min. Wherein, the temperature of the reactor was raised from a room temperature to 140° C. at a speed of 40° C./hour, and maintained at 140° C. for 3 hours, and then, raised to 200° C. at a speed of and maintained at 200° C. The solid state polymerization was progressed until intrinsic viscosity (IV) of particles in the reactor became 0.95 dl/g, thus preparing polyester copolymer.

Example 4

Step 1) Esterification

Into a reactor with a capacity of 10 L to which a column, and a condenser that can be cooled by water are connected, TPA (3127.4 g), EG (257.0 g), CHDM (2360.2 g), and ISB (302.6 g) were added, and GeO2 (16.4 g) as a catalyst, phosphoric acid (10.9 g) as a stabilizer, Polysynthren Blue RLS (Clarient, 0.020 g) as blue toner, Solvaperm Red BB (Clarient, 0.005 g) as red toner and Irganox 1076 (0.5 g) as an antioxidant were added.

Subsequently, nitrogen was added in the reactor to make a pressurized state where the pressure of the reactor is 1.0 $kgf/cm^2$ higher than atmospheric pressure. Further, the temperature of the reactor was raised to 220° C. over 90 minutes, and maintained at 220° C. for 2 hours, and then, raised to 240° C. over 2 hours. And then, the mixture in the reactor was observed with the naked eye, and until the mixture became transparent, while maintaining the temperature of the reactor at 240° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed Step 2) Condensation Polymerization The pressure of the reactor with a capacity of 7 L was lowered from atmospheric pressure state to 5 Torr (absolute pressure: 5 mmHg) over 30 minutes, and simultaneously, the temperature of the reactor was raised to 290° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.68 dl/g. If the intrinsic viscosity of the mixture in the reactor reached a desired level, the mixture was discharged outside the reactor and stranded, and it was solidified with a coolant, and then, granulated such that the average weight became about 12 to 14 mg.

The particles were left at 150° C. for 1 hour to crystallize, and then, added into a solid state polymerization reactor with a capacity of 20 L. And then, nitrogen was flowed into the reactor at a speed of 50 L/min. Wherein, the temperature of the reactor was raised from a room temperature to 140° C. at a speed of 40° C./hour, and maintained at 140° C. for 3 hours, and then, raised to 220° C. at a speed of and maintained at 220° C. The solid state polymerization was progressed until intrinsic viscosity (IV) of particles in the reactor became 1.0 dl/g, thus preparing polyester copolymer.

Example 5

Step 1) Esterification

Into a reactor with a capacity of 10 L to which a column, and a condenser that can be cooled by water are connected, TPA (2548.0 g), EG (304.5 g), CHDM (1635.6 g), and ISB (425.8 g) were added, and GeO2 (13.1 g) as a catalyst, phosphoric acid (8.7 g) as a stabilizer, Polysynthren Blue RLS (Clarient, 0.020 g) as blue toner, Solvaperm Red BB (Clarient, 0.008 g) as red toner and Irganox 1076 (0.4 g) as an antioxidant were added.

Subsequently, nitrogen was added in the reactor to make a pressurized state where the pressure of the reactor is 1.0 $kgf/cm^2$ higher than atmospheric pressure. Further, the temperature of the reactor was raised to 220° C. over 90 minutes, and maintained at 220° C. for 2 hours, and then, raised to 255° C. over 2 hours. And then, the mixture in the reactor was observed with the naked eye, and until the mixture became transparent, while maintaining the temperature of the reactor at 255° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed Step 2) Condensation Polymerization The pressure of the reactor with a capacity of 7 L was lowered from atmospheric pressure state to 5 Torr (absolute pressure: 5 mmHg) over 30 minutes, and simultaneously, the temperature of the reactor was raised to 280° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.70 dl/g. If the intrinsic viscosity of the mixture in the reactor reached a desired level, the mixture was discharged outside the reactor and stranded, and it was solidified with a coolant, and then, granulated such that the average weight became about 12 to 14 mg.

The particles were left at 150° C. for 1 hour to crystallize, and then, added into a solid state polymerization reactor with a capacity of 20 L. And then, nitrogen was flowed into the reactor at a speed of 50 L/min. Wherein, the temperature of the reactor was raised from a room temperature to 140° C. at a speed of 40° C./hour, and maintained at 140° C. for 3 hours, and then, raised to 220° C. at a speed of and maintained at 220° C. The solid state polymerization was progressed until intrinsic viscosity (IV) of particles in the reactor became 1.2 dl/g, thus preparing polyester copolymer.

Example 6

Step 1) Esterification

Into a reactor with a capacity of 10 L to which a column, and a condenser that can be cooled by water are connected, TPA (2382.2 g), EG (115.7 g), CHDM (1508.5 g), and ISB (398.1 g) were added, and GeO2 (12.4 g) as a catalyst, phosphoric acid (8.2 g) as a stabilizer, Polysynthren Blue RLS (Clarient, 0.027 g) as blue toner, Solvaperm Red BB (Clarient, 0.008 g) as red toner and Irganox 1076 (0.38 g) as an antioxidant were added.

Subsequently, nitrogen was added in the reactor to make a pressurized state where the pressure of the reactor is 0.5 kgf/cm$^2$ higher than atmospheric pressure. Further, the temperature of the reactor was raised to 220° C. over 90 minutes, and maintained at 220° C. for 2 hours, and then, raised to 250° C. over 2 hours. And then, the mixture in the reactor was observed with the naked eye, and until the mixture became transparent, while maintaining the temperature of the reactor at 250° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed Step 2) Condensation Polymerization The pressure of the reactor with a capacity of 7 L was lowered from atmospheric pressure state to 5 Torr (absolute pressure: 5 mmHg) over 30 minutes, and simultaneously, the temperature of the reactor was raised to 290° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond a predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.72 dl/g. If the intrinsic viscosity of the mixture in the reactor reached a desired level, the mixture was discharged outside the reactor and stranded, and it was solidified with a coolant, and then, granulated such that the average weight became about 12 to 14 mg.

The particles were left at 150° C. for 1 hour to crystallize, and then, added into a solid state polymerization reactor with a capacity of 20 L. And then, nitrogen was flowed into the reactor at a speed of 50 L/min. Wherein, the temperature of the reactor was raised from a room temperature to 140° C. at a speed of 40° C./hour, and maintained at 140° C. for 3 hours, and then, raised to 205° C. at a speed of and maintained at 205° C. The solid state polymerization was progressed until intrinsic viscosity (IV) of particles in the reactor became 1.1 dl/g, thus preparing polyester copolymer.

Example 7

Step 1) Esterification

Into a reactor with a capacity of 10 L to which a column, and a condenser that can be cooled by water are connected, DMT (dimethyl terephthalate; 3126.6 g), EG (1229.1 g), CHDM (1740.6 g), and ISB (753.0 g) were added, and GeO2 (13.8 g) as a catalyst, phosphoric acid (9.1 g) as a stabilizer, Polysynthren Blue RLS (Clarient, 0.021 g) as blue toner, and Solvaperm Red BB (Clarient, 0.008 g) as red toner were added.

Subsequently, nitrogen was added in the reactor to adjust the pressure of the reactor to atmospheric pressure. Further, the temperature of the reactor was raised to 220° C. over 90 minutes, and maintained at 220° C. for 2 hours, and then, raised to 240° C. over 2 hours. And then, the mixture in the reactor was observed with the naked eye, and until the mixture became transparent, while maintaining the temperature of the reactor at 240° C., esterification was progressed for 245 minutes. During this process, by-products were discharged through the column and condenser. After the esterification was completed, the mixture in the reactor was transferred to a reactor with a capacity of 7 L where a vacuum reaction can be progressed.

Step 2) Condensation Polymerization

The pressure of the reactor with a capacity of 7 L was lowered from atmospheric pressure state to 5 Torr (absolute pressure: 5 mmHg) over 30 minutes, and simultaneously, the temperature of the reactor was raised to 270° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond a predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.70 dl/g. If the intrinsic viscosity of the mixture in the reactor reached a desired level, the mixture was discharged outside the reactor and stranded, and it was solidified with a coolant, and then, granulated such that the average weight became about 12 to 14 mg.

The particles were left at 150° C. for 1 hour to crystallize, and then, added into a solid state polymerization reactor with a capacity of 20 L. And then, nitrogen was flowed into the reactor at a speed of 50 L/min. Wherein, the temperature of the reactor was raised from a room temperature to 140° C. at a speed of 40° C./hour, and maintained at 140° C. for 3 hours, and then, raised to 200° C. at a speed of and maintained at 200° C. The solid state polymerization was progressed until intrinsic viscosity (IV) of particles in the reactor became 1.0 dl/g, thus preparing polyester copolymer.

Example 8

Step 1) Esterification

Into a reactor with a capacity of 10 L to which a column, and a condenser that can be cooled by water are connected, TPA (2420.6 g), IPA (isophthalic acid; 127.4 g), EG (304.5 g), CHDM (1635.6 g), and ISB (425.8 g) were added, and GeO2 (13.1 g) as a catalyst, phosphoric acid (8.7 g) as a stabilizer, Polysynthren Blue RLS (Clarient, 0.020 g) as blue toner, and Solvaperm Red BB (Clarient, g) as red toner were added.

Subsequently, nitrogen was added in the reactor to make a pressurized state where the pressure of the reactor is 1.0 kgf/cm$^2$ higher than atmospheric pressure. Further, the temperature of the reactor was raised to 220° C. over 90 minutes, and maintained at 220° C. for 2 hours, and then, raised to 260° C. over 2 hours. And then, the mixture in the reactor was observed with the naked eye, and until the mixture became transparent, while maintaining the temperature of the reactor at 260° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed Step 2) Condensation Polymerization The pressure of the reactor with a capacity of 7 L was lowered from atmospheric pressure state to 5 Torr (absolute pressure: 5 mmHg) over 30 minutes, and simultaneously, the temperature of the reactor was raised to 285° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond a predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.70 dl/g. If the intrinsic viscosity of the mixture in the reactor reached a desired level, the mixture was discharged outside the reactor and stranded, and it was solidified with a coolant, and then, granulated such that the average weight became about 12 to 14 mg.

The particles were left at 150° C. for 1 hour to crystallize, and then, added into a solid state polymerization reactor with a capacity of 20 L. And then, nitrogen was flowed into the reactor at a speed of 50 L/min. Wherein, the temperature of the reactor was raised from a room temperature to 140° C. at a speed of 40° C./hour, and maintained at 140° C. for 3 hours, and then, raised to 200° C. at a speed of 40° C. hour, and maintained at 200° C. The solid state polymerization was progressed until intrinsic viscosity (IV) of particles in the reactor became 1.2 dl/g, thus preparing polyester copolymer.

Comparative Example 1

Step 1) Esterification

Into a reactor with a capacity of 10 L to which a column, and a condenser that can be cooled by water are connected, TPA (3417.6 g), EG (1314.8 g), and ISB (661.3 g) were added, and GeO2 (5.5 g) as a catalyst, phosphoric acid (3.0 g) as a stabilizer, Polysynthren Blue RLS (Clarient, 0.013 g) as blue toner, and Solvaperm Red BB (Clarient, 0.004 g) as red toner were added.

Subsequently, nitrogen was added in the reactor to make a pressurized state where the pressure of the reactor is 0.5 kgf/cm$^2$ higher than atmospheric pressure. Further, the temperature of the reactor was raised to 220° C. over 90 minutes, and maintained at 220° C. for 2 hours, and then, raised to 260° C. over 2 hours. And then, the mixture in the reactor was observed with the naked eye, and until the mixture became transparent, while maintaining the temperature of the reactor at 260° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed.

Step 2) Condensation Polymerization

The pressure of the reactor with a capacity of 7 L was lowered from atmospheric pressure state to 5 Torr (absolute pressure: 5 mmHg) over 30 minutes, and simultaneously, the temperature of the reactor was raised to 275° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond a predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.75 dl/g. If the intrinsic viscosity of the mixture in the reactor reached a desired level, the mixture was discharged outside the reactor and stranded, and it was solidified with a coolant, and then, granulated such that the average weight became about 12 to 14 mg, thus preparing polyester copolymer.

Comparative Example 2

Step 1) Esterification

Into a reactor with a capacity of 10 L to which a column, and a condenser that can be cooled by water are connected, TPA (2657.1 g), EG (793.9 g), CHDM (1498.2 g), and ISB (701.1 g) were added, and GeO2 (13.1 g) as a catalyst, phosphoric acid (8.7 g) as a stabilizer, Polysynthren Blue RLS (Clarient, 0.012 g) as blue toner, and Solvaperm Red BB (Clarient, 0.004 g) as red toner were added.

Subsequently, nitrogen was added in the reactor to make a pressurized state where the pressure of the reactor is 1.0 kgf/cm$^2$ higher than atmospheric pressure. Further, the temperature of the reactor was raised to 220° C. over 90 minutes, and maintained at 220° C. for 2 hours, and then, raised to 255° C. over 2 hours. And then, the mixture in the reactor was observed with the naked eye, and until the mixture became transparent, while maintaining the temperature of the reactor at 255° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed Step 2) Condensation Polymerization The pressure of the reactor with a capacity of 7 L was lowered from atmospheric pressure state to 5 Torr (absolute pressure: 5 mmHg) over 30 minutes, and simultaneously, the temperature of the reactor was raised to 285° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond a predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.65 dl/g. If the intrinsic viscosity of the mixture in the reactor reached a desired level, the mixture was discharged outside the reactor and stranded, and it was solidified with a coolant, and then, granulated such that the average weight became about 12 to 14 mg, thus preparing polyester copolymer.

Comparative Example 3

Step 1) Esterification

Into a reactor with a capacity of 10 L to which a column, and a condenser that can be cooled by water are connected, TPA (2209.6 g), CHDM (1859.2 g), and ISB (252.6 g) were added, and GeO2 (12.8 g) as a catalyst, phosphoric acid (8.5 g) as a stabilizer, Polysynthren Blue RLS (Clarient, 0.012 g) as blue toner, and Solvaperm Red BB (Clarient, 0.004 g) as red toner were added.

Subsequently, nitrogen was added in the reactor to make a pressurized state where the pressure of the reactor is 2.0 $kgf/cm^2$ higher than atmospheric pressure. Further, the temperature of the reactor was raised to 220° C. over 90 minutes, and maintained at 220° C. for 2 hours, and then, raised to 250° C. over 2 hours. And then, the mixture in the reactor was observed with the naked eye, and until the mixture became transparent, while maintaining the temperature of the reactor at 250° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed Step 2) Condensation Polymerization The pressure of the reactor with a capacity of 7 L was lowered from atmospheric pressure state to 5 Torr (absolute pressure: 5 mmHg) over 30 minutes, and simultaneously, the temperature of the reactor was raised to 270° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond a predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.70 dl/g. If the intrinsic viscosity of the mixture in the reactor reached a desired level, the mixture was discharged outside the reactor and stranded, and it was solidified with a coolant, and then, granulated such that the average weight became about 12 to 14 mg.

The particles were left at 150° C. for 1 hour to crystallize, and then, added into a solid state polymerization reactor with a capacity of 20 L. And then, nitrogen was flowed into the reactor at a speed of 50 L/min. Wherein, the temperature of the reactor was raised from a room temperature to 140° C. at a speed of 40° C./hour, and maintained at 140° C. for 3 hours, and then, raised to 200° C. at a speed of and maintained at 200° C. The solid state polymerization was progressed until intrinsic viscosity (IV) of particles in the reactor became 0.95 dl/g, thus preparing polyester copolymer.

Comparative Example 4

Step 1) Esterification

Into a reactor with a capacity of 10 L to which a column, and a condenser that can be cooled by water are connected, TPA (2377.9 g), CHDM (1835.9 g), and ISB (648.3 g) were added, and GeO2 (13.8 g) as a catalyst, phosphoric acid (9.1 g) as a stabilizer, Polysynthren Blue RLS (Clarient, 0.021 g) as blue toner, Solvaperm Red BB (Clarient, 0.004 g) as red toner, and Irganox 1076 (0.42 g) as an antioxidant were added.

Subsequently, nitrogen was added in the reactor to make a pressurized state where the pressure of the reactor is 1.0 $kgf/cm^2$ higher than atmospheric pressure. Further, the temperature of the reactor was raised to 220° C. over 90 minutes, and maintained at 220° C. for 2 hours, and then, raised to 265° C. over 2 hours. And then, the mixture in the reactor was observed with the naked eye, and until the mixture became transparent, while maintaining the temperature of the reactor at 265° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed Step 2) Condensation Polymerization The pressure of the reactor with a capacity of 7 L was lowered from atmospheric pressure state to 5 Torr (absolute pressure: 5 mmHg) over 30 minutes, and simultaneously, the temperature of the reactor was raised to 275° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond a predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.68 dl/g. If the intrinsic viscosity of the mixture in the reactor reached a desired level, the mixture was discharged outside the reactor and stranded, and it was solidified with a coolant, and then, granulated such that the average weight became about 12 to 14 mg.

The particles were left at 150° C. for 1 hour to crystallize, and then, added into a solid state polymerization reactor with a capacity of 20 L. And then, nitrogen was flowed into the reactor at a speed of 50 L/min. Wherein, the temperature of the reactor was raised from a room temperature to 140° C. at a speed of 40° C./hour, and maintained at 140° C. for 3 hours, and then, raised to 200° C. at a speed of and maintained at 200° C. The solid state polymerization was progressed until intrinsic viscosity (IV) of particles in the reactor became 1.0 dl/g, thus preparing polyester copolymer.

Comparative Example 5

Step 1) Esterification

Into a reactor with a capacity of 10 L to which a column, and a condenser that can be cooled by water are connected, TPA (2234.8 g), CHDM (1512.1 g), and ISB (825.5 g) were added, and GeO2 (12.9 g) as a catalyst, phosphoric acid (8.6 g) as a stabilizer, Polysynthren Blue RLS (Clarient, 0.020 g) as blue toner, Solvaperm Red BB (Clarient, 0.004 g) as red toner and high-density polyethylene (SK GeO centric YUZEX 2600S; 0.3950 g) as a crystallization agent were added.

Subsequently, nitrogen was added in the reactor to make a pressurized state where the pressure of the reactor is 0.5 $kgf/cm^2$ higher than atmospheric pressure. Further, the temperature of the reactor was raised to 220° C. over 90 minutes, and maintained at 220° C. for 2 hours, and then, raised to 260° C. over 2 hours. And then, the mixture in the reactor was observed with the naked eye, and until the mixture became transparent, while maintaining the temperature of the reactor at 260° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed.

Step 2) Condensation Polymerization

The pressure of the reactor with a capacity of 7 L was lowered from atmospheric pressure state to 5 Torr (absolute pressure: 5 mmHg) over 30 minutes, and simultaneously, the temperature of the reactor was raised to 275° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond a predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.70 dl/g. If the intrinsic viscosity of the mixture in the reactor reached a desired level, the mixture was discharged outside the reactor and stranded, and it was solidified with a coolant, and then, granulated such that the average weight became about 12 to 14 mg.

The particles were left at 150° C. for 1 hour to crystallize, and then, added into a solid state polymerization reactor with a capacity of 20 L. And then, nitrogen was flowed into the reactor at a speed of 50 L/min. Wherein, the temperature of the reactor was raised from a room temperature to 140° C. at a speed of 40° C./hour, and maintained at 140° C. for 3 hours, and then, raised to 200° C. at a speed of and maintained at 200° C. The solid state polymerization was progressed until intrinsic viscosity (IV) of particles in the reactor became 0.98 dl/g, thus preparing polyester copolymer.

Comparative Example 6

Step 1) Esterification

Into a reactor with a capacity to 10 L in which a column, and a condenser that can be cooled by water are connected, TPA (2612.0 g), EG (595.1 g), CHDM (1404.8 g), and ISB (160.8 g) were added, and GeO2 (12.4 g) as a catalyst, phosphoric acid (8.2 g) as a stabilizer, Polysynthren Blue RLS (Clarient, 0.011 g) as blue toner, Solvaperm Red BB (Clarient, 0.004 g) as red toner and trimellitic anhydride (0.38 g) as a branching agent were added.

Subsequently, nitrogen was added in the reactor to make a pressurized state where the pressure of the reactor is 1.0 $kgf/cm^2$ higher than atmospheric pressure. Further, the temperature of the reactor was raised to 220° C. over 90 minutes, and maintained at 220° C. for 2 hours, and then, raised to 265° C. over 2 hours. And then, the mixture in the reactor was observed with the naked eye, and until the mixture became transparent, while maintaining the temperature of the reactor at 265° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed.

Step 2) Condensation Polymerization

The pressure of the reactor with a capacity of 7 L was lowered from atmospheric pressure state to 5 Torr (absolute pressure: 5 mmHg) over 30 minutes, and simultaneously, the temperature of the reactor was raised to 280° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond a predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.70 dl/g. If the intrinsic viscosity of the mixture in the reactor reached a desired level, the mixture was discharged outside the reactor and stranded, and it was solidified with a coolant, and then, granulated such that the average weight became about 12 to 14 mg, thus preparing polyester copolymer.

Comparative Example 7

Step 1) Esterification

Into a reactor with a capacity of 10 L to which a column, and a condenser that can be cooled by water are connected, TPA (2576.1 g), EG (327.1 g), CHDM (1430.2 g), and ISB (951.6 g) were added, and GeO2 (13.4 g) as a catalyst, phosphoric acid (8.9 g) as a stabilizer, Polysynthren Blue RLS (Clarient, 0.021 g) as blue toner, Solvaperm Red BB (Clarient, 0.004 g) as red toner and high-density polyethylene (SK GeO centric YUZEX 2600S; 0.0041 g) as a crystallization agent were added.

Subsequently, nitrogen was added in the reactor to make a pressurized state where the pressure of the reactor is 0.5 $kgf/cm^2$ higher than atmospheric pressure. Further, the temperature of the reactor was raised to 220° C. over 90 minutes, and maintained at 220° C. for 2 hours, and then, raised to 270° C. over 2 hours. And then, the mixture in the reactor was observed with the naked eye, and until the mixture became transparent, while maintaining the temperature of the reactor at 270° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed.

Step 2) Condensation Polymerization

The pressure of the reactor with a capacity of 7 L was lowered from atmospheric pressure state to 5 Torr (absolute pressure: 5 mmHg) over 30 minutes, and simultaneously, the temperature of the reactor was raised to 275° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond a predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.67 dl/g. If the intrinsic viscosity of the mixture in the reactor reached a desired level, the mixture was discharged outside the reactor and stranded, and it was solidified with a coolant, and then, granulated such that the average weight became about 12 to 14 mg, thus preparing polyester copolymer.

Comparative Example 8

Step 1) Esterification

Into a reactor with a capacity of 10 L to which a column, and a condenser that can be cooled by water, TPA (2598.8 g), EG (223.2 g), CHDM (1668.3 g), and ISB (182.9 g) were added, and GeO2 (13.1 g) as a catalyst, phosphoric acid (8.7 g) as a stabilizer, Polysynthren Blue RLS (Clarient, 0.024 g) as blue toner, and Solvaperm Red BB (Clarient, 0.004 g) as red toner were added.

Subsequently, nitrogen was added in the reactor to make a pressurized state where the pressure of the reactor is 1.0 $kgf/cm^2$ higher than atmospheric pressure. Further, the temperature of the reactor was raised to 220° C. over 90 minutes, and maintained at 220° C. for 2 hours, and then, raised to 255° C. over 2 hours. And then, the mixture in the reactor was observed with the naked eye, and until the mixture became transparent, while maintaining the temperature of the reactor at 255° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed.

Step 2) Condensation Polymerization

The pressure of the reactor with a capacity of 7 L was lowered from atmospheric pressure state to 5 Torr (absolute pressure: 5 mmHg) over 30 minutes, and simultaneously, the temperature of the reactor was raised to 270° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond a predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.68 dl/g. If the intrinsic viscosity of the mixture in the reactor reached a desired level, the mixture was discharged outside the reactor and stranded, and it was solidified with a coolant, and then, granulated such that the average weight became about 12 to 14 mg.

The particles were left at 150° C. for 1 hour to crystallize, and then, added into a solid state polymerization reactor with a capacity of 20 L. And then, nitrogen was flowed into the reactor at a speed of 50 L/min. Wherein, the temperature of the reactor was raised from a room temperature to 140° C. at a speed of 40° C./hour, and maintained at 140° C. for 3 hours, and then, raised to 200° C. at a speed of and maintained at 200° C. The solid state polymerization was progressed until intrinsic viscosity (IV) of particles in the reactor became 1.0 dl/g, thus preparing polyester copolymer.

Comparative Example 9

Step 1) Esterification

Into a reactor with a capacity of 10 L to which a column, and a condenser that can be cooled by water are connected, TPA (2809.0 g), EG (430.2 g), CHDM (1583.9 g), and ISB (222.4 g) were added, and GeO2 (13.8 g) as a catalyst, phosphoric acid (9.1 g) as a stabilizer, Polysynthren Blue RLS (Clarient, 0.021 g) as blue toner, and Solvaperm Red BB (Clarient, 0.004 g) as red toner were added.

Subsequently, nitrogen was added in the reactor to make a pressurized state where the pressure of the reactor is 2.0 $kgf/cm^2$ higher than atmospheric pressure. Further, the temperature of the reactor was raised to 220° C. over 90 minutes, and maintained at 220° C. for 2 hours, and then, raised to 260° C. over 2 hours. And then, the mixture in the reactor was observed with the naked eye, and until the mixture became transparent, while maintaining the temperature of the reactor at 260° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed.

Step 2) Condensation Polymerization

The pressure of the reactor with a capacity of 7 L was lowered from atmospheric pressure state to 5 Torr (absolute pressure: 5 mmHg) over 30 minutes, and simultaneously, the temperature of the reactor was raised to 270° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond a predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.72 dl/g. If the intrinsic viscosity of the mixture in the reactor reached a desired level, the mixture was discharged outside the reactor and stranded, and it was solidified with a coolant, and then, granulated such that the average weight became about 12 to 14 mg, thus preparing polyester copolymer.

Comparative Example 10

Step 1) Esterification

Into a reactor with a capacity of 10 L to which a column, and a condenser that can be cooled by water are connected, TPA (2555.9 g), EG (305.5 g), CHDM (1330.3 g), and ISB (629.4 g) were added, and GeO2 (12.8 g) as a catalyst, phosphoric acid (8.5 g) as a stabilizer, Polysynthren Blue RLS (Clarient, 0.016 g) as blue toner, and Solvaperm Red BB (Clarient, 0.004 g) as red toner were added.

Subsequently, nitrogen was added in the reactor to make a pressurized state where the pressure of the reactor is 1.0 kgf/cm$^2$ higher than atmospheric pressure. Further, the temperature of the reactor was raised to 220° C. over 90 minutes, and maintained at 220° C. for 2 hours, and then, raised to 250° C. over 2 hours. And then, the mixture in the reactor was observed with the naked eye, and until the mixture became transparent, while maintaining the temperature of the reactor at 250° C., esterification was progressed for 245 minutes. During this process, by-products were discharged through the column and condenser. After the esterification was completed, nitrogen inside the reactor of a pressurized state was discharged outside to lower the pressure of the reactor to atmospheric pressure, and then, the mixture in the reactor was transferred to a reactor with a capacity of 7 L where a vacuum reaction can be progressed.

Step 2) Condensation Polymerization

The pressure of the reactor with a capacity of 7 L was lowered from atmospheric pressure state to 5 Torr (absolute pressure: 5 mmHg) over 30 minutes, and simultaneously, the temperature of the reactor was raised to 275° C. over 1 hour, and while maintaining the pressure of the reactor at 1 Torr (absolute pressure: 1 mmHg) or less, condensation polymerization was conducted. At the beginning of condensation polymerization, a stirring speed was set rapid, but if a stirring force decreases or the temperature of the reactant increases beyond a predetermined temperature due to viscosity increase of the reactant with the progression of condensation polymerization, the stirring speed may be appropriately controlled. The condensation polymerization was progressed until intrinsic viscosity (IV) of the mixture (molten material) in the reactor became 0.70 dl/g. If the intrinsic viscosity of the mixture in the reactor reached a desired level, the mixture was discharged outside the reactor and stranded, and it was solidified with a coolant, and then, granulated such that the average weight became about 12 to 14 mg, thus preparing polyester copolymer.

EXPERIMENTAL EXAMPLE

For the copolymers prepared in Examples and Comparative Examples, the properties were evaluated as follows.

1) Intrinsic viscosity: The polyester copolymer was dissolved in 150° C. orthohclorophenol (OCP) at the concentration of 0.12%, and then, intrinsic viscosity was measured using Ubbelohde viscometer in a 35° C. thermostat.

2) Storage modulus: The polyester copolymers prepared in Examples and Comparative Examples were made into specimens with a length of 17.5 mm, width of 13 mm, and thickness of 0.8 mm. The specimens were measured using Q800 equipment of TA Instruments, under conditions of temperature range of to 180° C., a temperature rise rate of 3° C./min, frequency of 1 Hz, and amplitude of 15 μm, in a single-cantilever mode, and a value measured at 40° C. was determined as storage modulus.

3) Melting point and heat of fusion: Using DSC1 equipment of Mettler toledo, melting point and heat of fusion were measured. Specifically, each polyester copolymer prepared in Examples and Comparative Examples was processed at a temperature of about 250 to 270° C. using injection molding machine to obtain an injection molded product of a flat plate specimen with a thickness of 6 mm, and then, for the polyester copolymer injection molded products, melting point and heat of fusion were measured at a temperature rise rate of +5° C./min, under nitrogen.

4) Glass transition temperature: Using Q800 equipment of TA Instruments, for each polyester copolymer prepared in Examples and Comparative Examples, glass transition temperature was measured at a temperature rise rate of 3° C./min, and a frequency of 10 Hz.

5) Melting point and heat of fusion: Using DSC1 equipment of Mettler toledo, for each polyester copolymer prepared in Examples and Comparative Examples, melting point and heat of fusion were measured at a temperature rise rate of +10° C./min, under nitrogen.

6) Measurement of draw ratio: Each polyester copolymer prepared in Examples and Comparative Examples was melt extruded at 290° C. to prepare a non-drawn film with a thickness of 300 μm. It was drawn in a machine direction at a temperature 30° C. higher than the glass transition temperature of each copolymer. Specifically, machine direction drawing was conducted at a rate of 750%/min, and it was evaluated whether or not drawing of 400% or more could be conducted.

The results were shown in the following Table 1.

TABLE 1

| Unit | IV dl/g | Storage modulus MPa | Glass transition temperature ° C. | Melting point ° C. | Heat of fusion J/g | Draw ratio of 400% or more — | Property factor[1)] |
|---|---|---|---|---|---|---|---|
| Example 1 | 0.80 | 1900 | 90 | 232 | 5 | ○ | 147.4 |
| Example 2 | 0.65 | 1800 | 110 | 240 | 1 | ○ | 825 |
| Example 3 | 0.95 | 1830 | 100 | 250 | 16 | ○ | 45.8 |
| Example 4 | 1.0 | 1800 | 92 | 265 | 20 | ○ | 31.2 |
| Example 5 | 1.2 | 1900 | 100 | 237 | 10 | ○ | 77.8 |
| Example 6 | 1.1 | 2010 | 106 | 230 | 1 | ○ | 926.3 |
| Example 7 | 1.0 | 1930 | 100 | 235 | 12 | ○ | 68.4 |
| Example 8 | 1.2 | 1900 | 100 | 237 | 10 | ○ | 77.8 |
| Comparative Example 1 | 0.75 | 1900 | 95 | — | — | ○ | — |

TABLE 1-continued

| Unit | IV dl/g | Storage modulus MPa | Glass transition temperature ° C. | Melting point ° C. | Heat of fusion J/g | Draw ratio of 400% or more — | Property factor[1)] |
|---|---|---|---|---|---|---|---|
| Comparative Example 2 | 0.65 | 1750 | 97 | — | — | X | — |
| Comparative Example 3 | 0.95 | 1680 | 94 | 270 | 36 | ○ | 16.2 |
| Comparative Example 4 | 1.0 | 1750 | 104 | 260 | 30 | ○ | 23.3 |
| Comparative Example 5 | 0.98 | 1900 | 117 | 225 | 0.5 | X | 1976.0 |
| Comparative Example 6 | 0.70 | 1750 | 86 | — | — | X | — |
| Comparative Example 7 | 0.67 | 1680 | 118 | — | — | X | — |
| Comparative Example 8 | 1.0 | 1700 | 88 | 250 | 21 | ○ | 28.5 |
| Comparative Example 9 | 0.72 | 1730 | 91 | — | — | X | — |
| Comparative Example 10 | 0.70 | 1650 | 104 | — | — | X | — |

[1)]property factor = {(storage modulus) * (glass transition temperature)}/{(melting point)/(heat of fusion)}

In the Table 1, in the case of Comparative Examples 1, 2, 6, 7, 9 and since the polymers are non-crystalline, melting point and heat of fusion did not exist. Non-crystalline resin has lower storage modulus and drawing property compared to crystalline resin, and thus, has insufficient strength and moldability. Further, in the case of Comparative Example 5, heat of fusion is excessively low, meaning that it exhibits property similar to non-crystalline resin. Further, it can be confirmed that in the case of Comparative Example 8, glass transition temperature is excessively low, and thus, heat resistance is low. Meanwhile, it can be confirmed that in the case of Examples 1 to 8 according to the present disclosure, storage modulus is high and glass transition temperature is high, and thus, strength and heat resistance are excellent. Further, in the case of Examples 1 to 8 according to the present disclosure, melting point and heat of fusion are high, confirming that the polymers are crystalline.

Further, draw ratio of 400% or more means that polyester resin has high crystallinity, and polyesters according to the present disclosure all exhibited draw ratios of 400% or more, while in the case of Comparative Examples 2, 5, 6, 7, 9 and 10, due to low crystallinities, low drawing properties were exhibited.

What is claimed is:

1. A polyester copolymer comprising

1) Residues of dicarboxylic acid components comprising terephthalic acid; and

2) Residues of diol components comprising isosorbide, cyclohexanedimethanol, and non-cyclic diol, wherein the copolymer comprises the isosorbide residues, cyclohexanedimethanol residues, and non-cyclic diol residues respectively in the content of 4 to 20 mol %, 65 to 85 mol %, and 11 to 31 mol %, based on the total number of moles of the diol component residues, and satisfies the following Mathematical Formula 1:

$$30 < (X * Y)/(Z * w) < 1000 \qquad \text{[Mathematical Formula 1]}$$

in the Mathematical Formula 1,

X is storage modulus (unit: MPa) of the polyester copolymer at 40° C.,

Y is glass transition temperature (unit: ° C.) of the polyester copolymer,

Z is melting point (unit: ° C.) of the polyester copolymer, and

W is heat of fusion (unit: J/g) of the polyester copolymer.

2. The polyester copolymer according to claim 1, wherein the polyester copolymer satisfies the following Mathematical Formula 2:

$$0.04 \leq (ISB)/(ISB + CHDM) \leq 0.22 \qquad \text{[Mathematical Formula 2]}$$

in the Mathematical Formula 2,

ISB denotes mol % of the isosorbide residues, based on the total number of moles of the diol component residues, CHDM denotes mol % of cyclohexanedimethanol residues, based on the total number of moles of the diol component residues.

3. The polyester copolymer according to claim 1, wherein the residues of dicarboxylic acid components further comprise residues of one or more selected from the group consisting of dimethyl terephthalic acid, isophthalic acid, 2,6-naphthalene dicarboxylic acid, diphenyl dicarboxylic acid, 4,4'-stilbene dicarboxylic acid, 2,5-furane dicarboxylic acid, and 2,5-thiophene dicarboxylic acid.

4. The polyester copolymer according to claim 1, wherein storage modulus (X) of the polyester copolymer is 1700 to 2100 MPa.

5. The polyester copolymer according to claim 1, wherein glass transition temperature (Y) of the polyester copolymer is 85 to 115° C.

6. The polyester copolymer according to claim 1, wherein melting point (Z) of the polyester copolymer is 225 to 270° C.

7. The polyester copolymer according to claim 1, wherein heat of fusion (W) of the polyester copolymer is 1 to 20 J/g.

8. The polyester copolymer according to claim 1, wherein the non-cyclic diol is $C_{2-10}$ alkylenediol.

9. The polyester copolymer according to claim 1, wherein the non-cyclic diol is ethylene glycol or diethylene glycol.

* * * * *